(12) United States Patent
Vigen et al.

(10) Patent No.: US 12,467,426 B2
(45) Date of Patent: Nov. 11, 2025

(54) FUEL INJECTION SYSTEMS FOR SNOWMOBILES

(71) Applicant: Arctic Cat Inc., Thief River Falls, MN (US)

(72) Inventors: David L. Vigen, Thief River Falls, MN (US); Benjamin Taylor Langaas, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 18/428,166

(22) Filed: Jan. 31, 2024

(65) Prior Publication Data

US 2025/0243834 A1  Jul. 31, 2025

(51) Int. Cl.
| | |
|---|---|
| *F02M 69/46* | (2006.01) |
| *B62M 27/02* | (2006.01) |
| *F02M 35/10* | (2006.01) |
| *F02M 55/04* | (2006.01) |
| *F02M 57/04* | (2006.01) |
| *F02M 59/34* | (2006.01) |
| *F02M 61/14* | (2006.01) |

(52) U.S. Cl.
CPC ............ *F02M 55/04* (2013.01); *B62M 27/02* (2013.01); *F02M 35/10216* (2013.01); *F02M 57/04* (2013.01); *F02M 59/34* (2013.01); *F02M 61/145* (2013.01); *B62M 2027/023* (2013.01); *F02M 2200/09* (2013.01); *F02M 2200/28* (2013.01); *F02M 2200/857* (2013.01)

(58) Field of Classification Search
CPC .... F02M 69/044; F02M 69/042; F02M 61/14; F02M 61/145; F02M 2200/00; F02M 2200/09; F02M 2200/05; F02M 2200/90; F02M 2200/9015; F02M 2200/851; F02M 2200/852; F02M 2200/85; F02M 2200/853; F02M 2200/855; F02M 2200/856; F02M 2200/857; F02M 2200/858

USPC .................................................... 123/470, 445

See application file for complete search history.

(56) References Cited

U.S. PATENT DOCUMENTS

| | | | |
|---|---|---|---|
| 4,389,982 A * | 6/1983 | Boyesen | F01L 3/205 123/433 |
| 5,482,021 A | 1/1996 | Roche | |
| 5,673,671 A * | 10/1997 | Kato | F02B 31/06 123/308 |
| 5,904,130 A | 5/1999 | Romanelli | |
| 6,039,029 A | 3/2000 | Nagasaka et al. | |
| 6,269,797 B1 | 8/2001 | Uchida | |

(Continued)

FOREIGN PATENT DOCUMENTS

| | | | | |
|---|---|---|---|---|
| CN | 108138720 A * | 6/2018 | ......... | F02D 19/0642 |
| IT | 102020000019471 B1 * | 9/2022 | | |

(Continued)

*Primary Examiner* — Lindsay M Low
*Assistant Examiner* — Teuta B Holbrook
(74) *Attorney, Agent, or Firm* — Lawrence Youst PLLC

(57) ABSTRACT

A fuel injection system for an engine of a vehicle includes a throttle body and an elastomeric injection manifold coupled to the downstream end of the throttle body. The injection manifold defines a fuel injector socket. The fuel injection system also includes a fuel injector receivable by the fuel injector socket of the injection manifold and a fuel rail fluidly coupled to the fuel injector. The fuel rail supplies fuel to the fuel injector.

16 Claims, 13 Drawing Sheets

(56) References Cited

U.S. PATENT DOCUMENTS

| | | |
|---|---|---|
| 6,390,869 B2 | 5/2002 | Korenjak et al. |
| 6,568,970 B2 | 5/2003 | Berthiaume et al. |
| 6,601,528 B2 | 8/2003 | Bilek et al. |
| 6,626,154 B1 | 9/2003 | Kanno |
| 6,695,657 B2 | 2/2004 | Hattori |
| 6,736,110 B2 | 5/2004 | Kato |
| 6,752,114 B2 | 6/2004 | Ochiai et al. |
| 6,901,888 B2 | 6/2005 | Baasch et al. |
| 6,912,996 B2 | 7/2005 | Kato |
| 6,915,768 B2 | 7/2005 | Ohsawa |
| 7,089,892 B1 * | 8/2006 | Hosaluk .................. F02B 33/12 |
| | | 123/73 A |
| 7,219,657 B2 | 5/2007 | Hotta et al. |
| 7,640,921 B2 | 1/2010 | Konakawa et al. |
| 7,690,356 B2 | 4/2010 | Hotta et al. |
| 8,156,924 B2 | 4/2012 | Hudak et al. |
| 8,464,684 B2 | 6/2013 | Kusel |
| 8,516,994 B2 | 8/2013 | Gregoire |
| 9,371,786 B2 * | 6/2016 | Casoni ............. F02M 35/10216 |
| 10,294,904 B2 | 5/2019 | Tanaka et al. |
| 11,384,697 B2 | 7/2022 | Buchwitz et al. |
| 11,421,634 B2 | 8/2022 | Yasoshina et al. |
| 11,541,956 B2 | 1/2023 | Uchiyama et al. |
| 2004/0078134 A1 * | 4/2004 | Yin .................. F02D 41/26 |
| | | 123/406.47 |
| 2006/0272599 A1 * | 12/2006 | Johnson ............... F02M 69/046 |
| | | 123/65 PE |
| 2006/0293841 A1 | 12/2006 | Hrovat et al. |
| 2008/0202472 A1 | 8/2008 | Whatley et al. |
| 2009/0018750 A1 * | 1/2009 | Kadam ................ F02M 69/465 |
| | | 701/103 |
| 2010/0018491 A1 * | 1/2010 | Fornara ............ F02M 35/10118 |
| | | 123/184.21 |
| 2012/0291747 A1 | 11/2012 | Jurjevec et al. |
| 2018/0283293 A1 | 10/2018 | Schwulst et al. |
| 2018/0347433 A1 | 12/2018 | Montinaro et al. |
| 2019/0101043 A1 | 4/2019 | Reeves et al. |
| 2020/0011258 A1 | 1/2020 | Schwulst et al. |
| 2020/0080503 A1 * | 3/2020 | Lebreux ................ F02N 11/04 |
| 2020/0182142 A1 | 6/2020 | Zimney et al. |
| 2021/0148318 A1 * | 5/2021 | Fredrickson ..... F02M 35/10222 |
| 2021/0356031 A1 | 11/2021 | Varaldi et al. |
| 2023/0358185 A1 * | 11/2023 | Thibault ............... F02M 35/162 |

FOREIGN PATENT DOCUMENTS

| | | | | |
|---|---|---|---|---|
| JP | H0893495 A | * | 4/1996 | |
| JP | H08218987 A | * | 8/1996 | ............. F01L 3/205 |
| JP | 2997750 B2 | * | 1/2000 | |
| JP | 2003106128 A | * | 4/2003 | ............. F01M 3/02 |
| JP | 2006161617 A | * | 6/2006 | |
| JP | 2008075607 A | * | 4/2008 | ............. F02B 61/02 |
| WO | WO-2019073448 A1 | * | 4/2019 | ............. F01L 3/205 |

\* cited by examiner

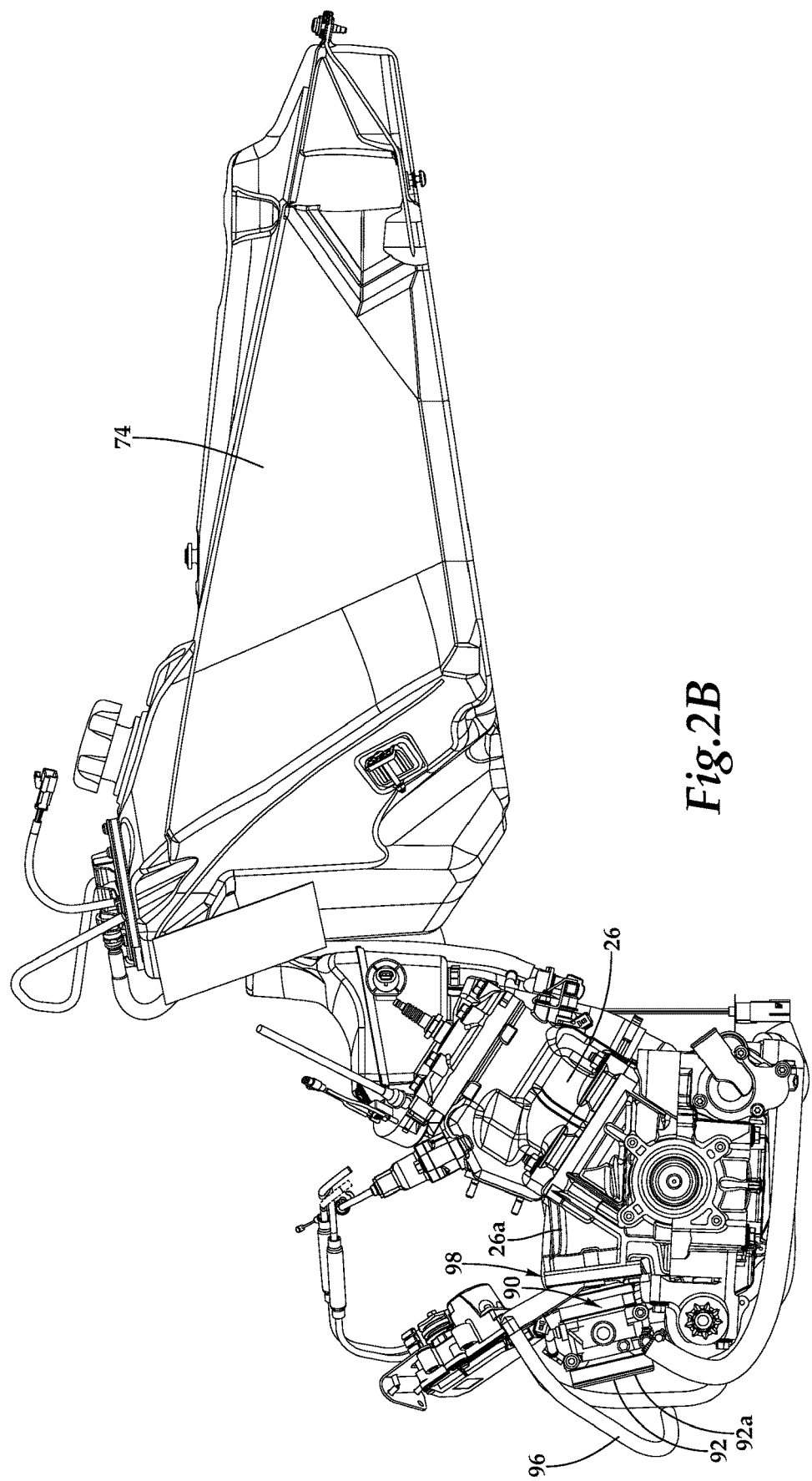

FUEL INJECTION SYSTEMS FOR SNOWMOBILES

TECHNICAL FIELD OF THE DISCLOSURE

The present disclosure relates, in general, to fuel injection systems for snowmobile engines and, in particular, to fuel injection systems including an elastomeric injection manifold interposed between an engine block and a throttle body, the injection manifold defining a fuel injector socket securing a fuel injector.

BACKGROUND

Snowmobiles are popular land vehicles used for transportation and recreation in cold and snowy conditions. Certain snowmobiles are designed for specific applications such as trail, utility, mountain, race and crossover applications, to name a few. Snowmobiles typically include a frame assembly, or chassis, that supports various components of the snowmobile such as an engine, a transmission and a ground-engaging endless drive track disposed in a longitudinally extending drive tunnel. The engine and transmission power the drive track to enable ground propulsion for the vehicle. A rider controls the operation of the snowmobile using a steering system including a handlebar assembly that is operatively linked to a pair of ski assemblies that provides flotation for the front of the snowmobile over the snow.

Snowmobile fuel injection systems typically include, or work in conjunction with, a throttle body, which controls the amount of filtered air entering the engine. More specifically, the throttle body defines an airflow channel and the amount of filtered air entering the engine is controlled by a butterfly valve located in the airflow channel. The throttle of the snowmobile is operatively linked to the butterfly valve such that engaging the throttle opens the butterfly valve to allow more filtered air to enter the engine. Fuel injection systems also include a fuel injector that sprays fuel into the filtered air at some point along the airflow path to the engine to form an air-fuel mixture that is combusted by the engine. In existing fuel injection systems, the fuel injector is hard-mounted on a metal throttle body and injects fuel into the throttle body airflow channel. In these existing systems, due to the distance between the engine and the throttle body, fuel delivery to the engine is less immediate, resulting in a less efficient engine and degraded throttle response. Another drawback of injecting fuel directly into the throttle body airflow channel is the larger distance between the point of fuel injection and the reed valve, which is downstream of the throttle body, resulting in a less atomized air-fuel mixture. Reduced fuel atomization also occurs in cylinder wall injection designs, in which the fuel injector emits fuel directly into the cylinder of the engine.

In addition, a number of drawbacks result from mounting the fuel injector to the metal material from which the throttle body is made. For example, vibrations from other parts of the snowmobile are readily transferred to the fuel injector, which reduces the life cycle of the fuel injector and can lead to permanent damage. Also, metal throttle bodies tend to condensate and have moisture buildup, especially on the bottom of the throttle body airflow channel where moisture pools at the bottom of the airflow channel due to gravity. Moisture inside the throttle body is easily frozen in the low-temperature operating environment of a snowmobile, which can cause the fuel injector to freeze and thereby degrade operation of the engine. This freezing issue is a particular risk in snowmobile fuel injection systems in which the fuel injector is mounted on the bottom side of a metal throttle body since the moisture pooled at the bottom of the throttle body airflow channel is prone to freezing. Mounting a fuel injector to a metal throttle body is also costly due to the need to machine a mount in the throttle body to accept the fuel injector. Accordingly, a need has arisen for improved fuel injection systems that avoid hard-mounting the fuel injector on the throttle body and instead, position the fuel injector in a location and operating environment that avoids the aforementioned drawbacks.

SUMMARY

In a first aspect, the present disclosure is directed to a fuel injection system for an engine of a vehicle. The fuel injection system includes a throttle body and an elastomeric injection manifold coupled to the downstream end of the throttle body. The injection manifold defines a fuel injector socket. The fuel injection system also includes a fuel injector receivable by the fuel injector socket of the injection manifold and a fuel rail fluidly coupled to the fuel injector. The fuel rail supplies fuel to the fuel injector.

In some embodiments, the top side of the injection manifold may define the fuel injector socket. In certain embodiments, the injection manifold may be formed from rubber. In some embodiments, the injection manifold may be a nonmetallic vibration damping injection manifold that reduces vibration transferred to the fuel injector from other parts of the vehicle. In certain embodiments, the injection manifold may include a flat plate portion and a throttle body fitting, the plate portion downstream of the throttle body fitting. In such embodiments, the fuel injector socket may be at least partially interposed between the plate portion and the throttle body fitting. In some embodiments, the injection manifold may have an upstream side including a circular throttle body fitting having an inner diameter and the downstream end of the throttle body may define a circular conduit having an outer diameter. In such embodiments, the inner diameter may be greater than or equal to the outer diameter. In certain embodiments, the fuel injector socket may be a tilted fuel injector socket tilted toward the throttle body to form an acute angle therewith. In some embodiments, the fuel rail may include a fuel rail mounting arm coupled to the injection manifold. In certain embodiments, the fuel injection system may include a reed valve coupled to the downstream side of the injection manifold such that the injection manifold is interposed between the throttle body and the reed valve. In some embodiments, the fuel injector socket may be a tilted fuel injector socket such that the fuel injector received therein has a fuel spray path at least partially covering the upstream end of the reed valve.

In a second aspect, the present disclosure is directed to a snowmobile having a frame assembly including a forward frame assembly, a powertrain including an engine disposed in the forward frame assembly and a fuel injection system coupled to the engine. The fuel injection system includes a throttle body and an elastomeric injection manifold coupled to the downstream end of the throttle body. The injection manifold defines a fuel injector socket. The fuel injection system also includes a fuel injector receivable by the fuel injector socket of the injection manifold and a fuel rail fluidly coupled to the fuel injector. The fuel rail supplies fuel to the fuel injector.

In some embodiments, the throttle body may include first and second throttle bodies and the injection manifold may include first and second injection manifolds coupled to the downstream ends of the first and second throttle bodies, respectively. In such embodiments, the fuel injector may include first and second fuel injectors and the fuel injector sockets of the first and second injection manifolds may receive the first and second fuel injectors, respectively. Also in such embodiments, the fuel rail may include a first fuel rail and a second fuel rail, with the first fuel rail fluidly coupled to the first fuel injector and the second fuel rail fluidly coupled to the second fuel injector. In certain embodiments, the first fuel rail may include a first fuel rail mounting arm coupled to the first injection manifold and the second fuel rail may include a second fuel rail mounting arm coupled to the second injection manifold. In some embodiments, each injection manifold may include a flat plate portion defining a plurality of fastener holes. In such embodiments, the first fuel rail mounting arm of the first fuel rail may be coupled to the first injection manifold using one or more fasteners received by the fastener holes defined by the plate portion of the first injection manifold. Also in such embodiments, the second fuel rail mounting arm of the second fuel rail may be coupled to the second injection manifold using one or more fasteners received by the fastener holes defined by the plate portion of the second injection manifold. In certain embodiments, the fastener holes defined by the plate portion of each injection manifold may include one or more top fastener holes and one or more side fastener holes. In such embodiments, the first fuel rail mounting arm of the first fuel rail may be coupled to the first injection manifold using fasteners received by the one or more top fastener holes and the one or more side fastener holes defined by the plate portion of the first injection manifold. Also in such embodiments, the second fuel rail mounting arm of the second fuel rail may be coupled to the second injection manifold using fasteners received by the one or more top fastener holes and the one or more side fastener holes defined by the plate portion of the second injection manifold.

In some embodiments, the throttle body may include first and second throttle bodies and the injection manifold may include first and second injection manifolds coupled to the downstream ends of the first and second throttle bodies, respectively. In such embodiments, the fuel injector may include first and second fuel injectors and the fuel injector sockets of the first and second injection manifolds may receive the first and second fuel injectors, respectively. Also in such embodiments, the fuel rail may be a fuel monorail fluidly coupled to the first and second fuel injectors, with the fuel monorail supplying fuel to the first and second fuel injectors. In certain embodiments, the fuel monorail may have a first end including a first fuel rail mounting arm and a second end including a second fuel rail mounting arm. In such embodiments, the first fuel rail mounting arm may be coupled to the first injection manifold and the second fuel rail mounting arm may be coupled to the second injection manifold. In some embodiments, each injection manifold may include a flat plate portion defining a plurality of fastener holes. In such embodiments, the first fuel rail mounting arm may be coupled to the first injection manifold using one or more fasteners received by the fastener holes defined by the plate portion of the first injection manifold. Also in such embodiments, the second fuel rail mounting arm may be coupled to the second injection manifold using one or more fasteners received by the fastener holes defined by the plate portion of the second injection manifold. In certain embodiments, the fastener holes defined by the plate portion of each injection manifold may include one or more top fastener holes. In such embodiments, the first fuel rail mounting arm may be coupled to the first injection manifold using one or more fasteners received by the one or more top fastener holes defined by the plate portion of the first injection manifold. Also in such embodiments, the second fuel rail mounting arm may be coupled to the second injection manifold using one or more fasteners received by the one or more top fastener holes defined by the plate portion of the second injection manifold. In some embodiments, the injection manifold may include a flat plate portion defining a plurality of fastener holes. In such embodiments, the downstream side of the plate portion of the injection manifold may be coupled to the engine using a plurality of fasteners received by the fastener holes.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2C are isometric and side views of an engine and fuel system for a snowmobile in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
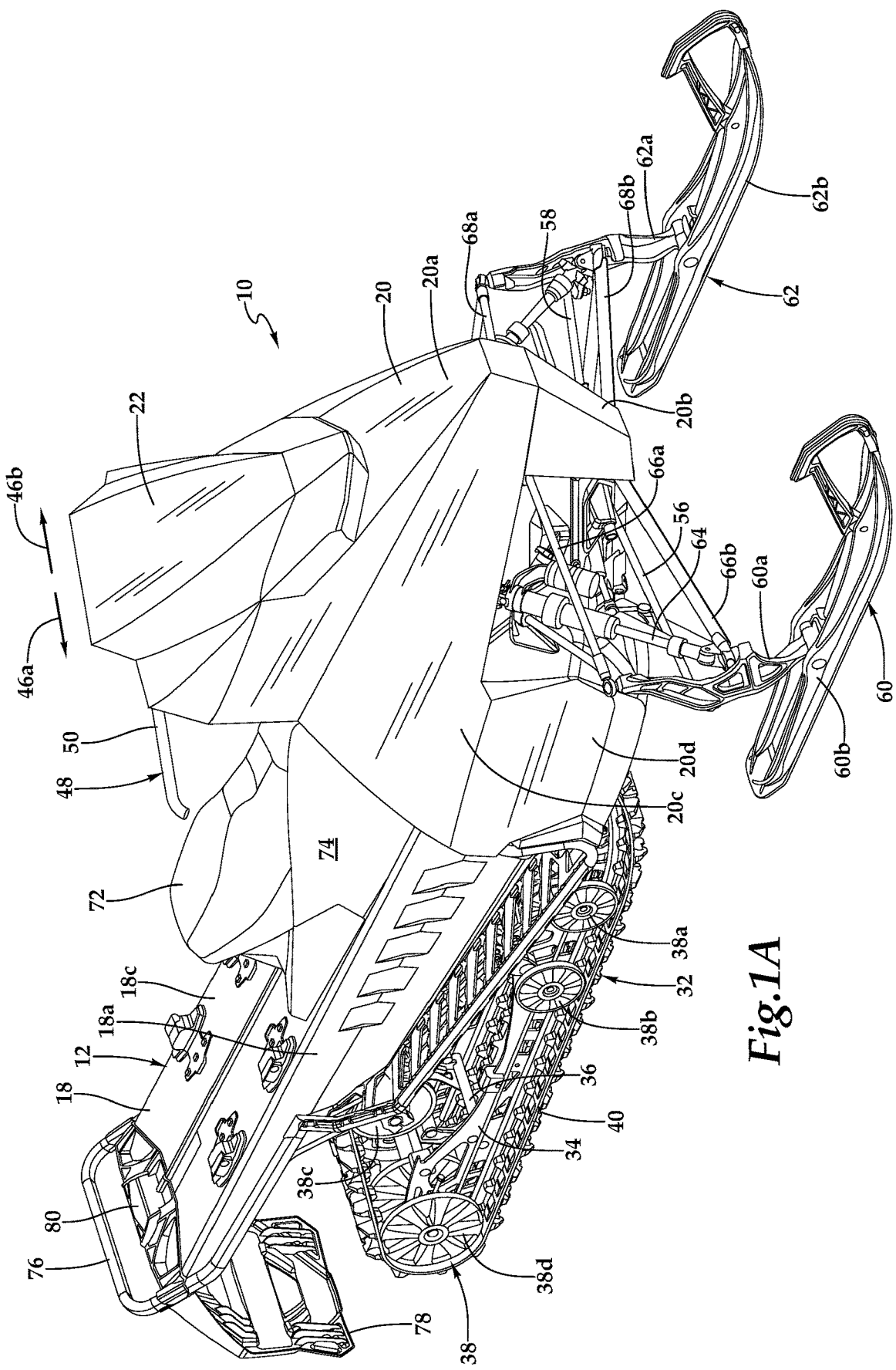
FIGS. 1A-1C are isometric and side views of a snowmobile having a fuel injection system in accordance with embodiments of the present disclosure.
Figure 1B:
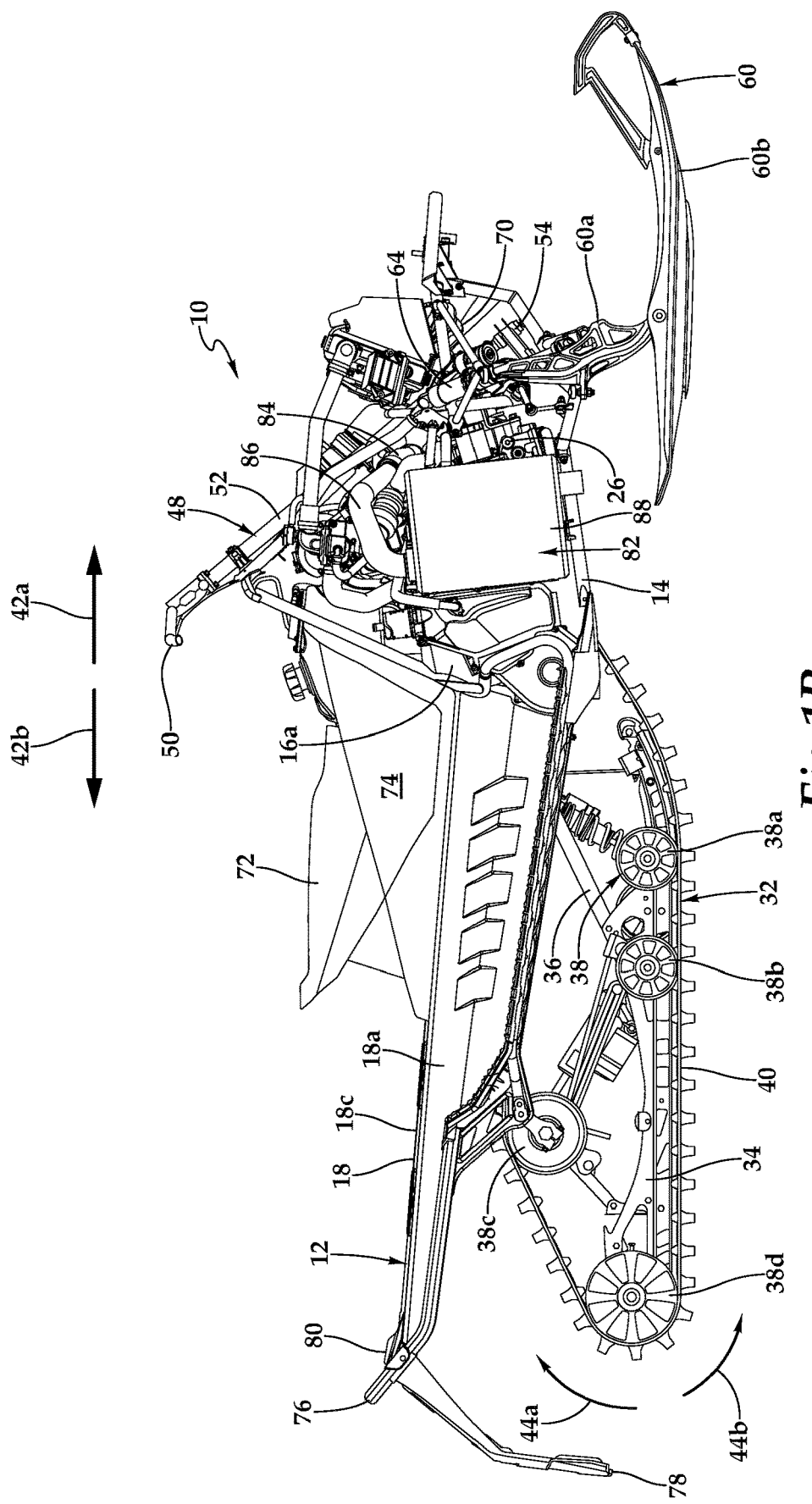
Figure 1C:
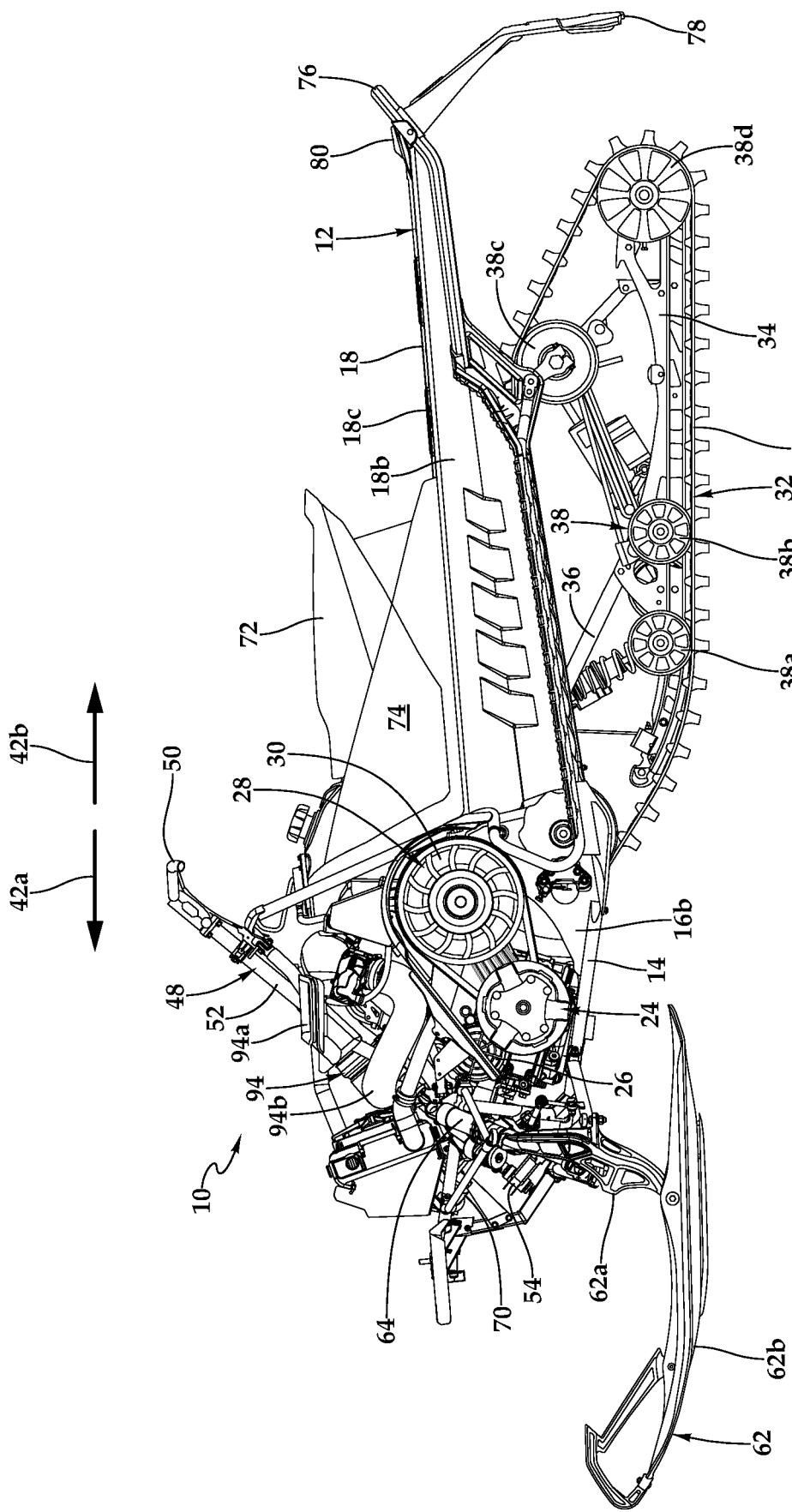

Referring to FIGS. 1A-1C in the drawings, a land vehicle depicted as a snowmobile is schematically illustrated and generally designated 10. Structural support for snowmobile 10 is provided by a chassis 12 that includes a forward frame assembly 14, a right side plate member 16a, a left side plate member 16b and a longitudinally extending drive tunnel 18. Forward frame assembly 14 is formed from interconnected tubular members such as round and hollow tubular members comprised of metal, metal alloy, polymeric materials, fiber reinforced polymer composites and/or combinations thereof that are coupled together by welds, bolts, pins or other suitable fastening means. Plate members 16a, 16b are coupled to and preferably welded to forward frame assembly 14 such that forward frame assembly 14 and plate members 16a, 16b form a welded frame assembly. Drive tunnel 18 is coupled to forward frame assembly 14 and/or plate members 16a, 16b with welds, bolts, rivets or other suitable means. In the illustrated embodiment, drive tunnel 18 includes a right side panel 18a, a left side panel 18b and a top panel 18c. Drive tunnel 18 may be integrally formed or may consist of multiple members that are coupled together with welds, bolts, rivets or other suitable means. Plate members 16a, 16b and drive tunnel 18 may be formed from sheet metal, metal alloy, fiber reinforced polymer or other suitable material or combination of materials.

Various components of snowmobile 10 are assembled on or around forward frame assembly 14. One or more body panels 20 cover and protect the various components of snowmobile 10 including parts of forward frame assembly 14. For example, a hood panel 20a, a nose panel 20b, an upper right side panel 20c and a lower right side panel 20d shield underlying componentry from snow and terrain. Similarly, an upper left side panel and a lower left side panel (not visible) also shield underlying componentry from snow and terrain. In the illustrated embodiment, snowmobile 10 has a windshield 22 that shields the rider of snowmobile 10 from snow, terrain and frigid air during operation. Even through snowmobile 10 has been described and depicted as including specific body panels 20, it should be understood by those having ordinary skill in the art that a snowmobile of the present disclosure may include any number of body panels in any configuration to provide the shielding functionality. In addition, it should be understood by those having ordinary skill in the art that the right side and the left side of snowmobile 10 will be with reference to a seated rider of snowmobile 10 with the right side of snowmobile 10 corresponding to the right side of the rider and the left side of snowmobile 10 corresponding to the left side of the rider.

Body panels 20 have been removed from snowmobile 10 in FIGS. 1B-1C to reveal the underlying components of snowmobile 10. For example, snowmobile 10 has a powertrain 24 that includes an engine 26 and a drivetrain 28, both of which are coupled to forward frame assembly 14. Drivetrain 28 includes a continuously variable transmission 30, which varies the ratio of the engine output speed to the drive track input speed. In other embodiments, continuously variable transmission 30 may alternatively be a mechanically or electrically variable transmission or other suitable transmission type for varying the ratio of the engine output speed to the drive track input speed. A drive track system 32 is at least partially disposed within and/or below drive tunnel 18 and is in contact with the ground to provide ground propulsion for snowmobile 10. Torque and rotational energy are provided to drive track system 32 from powertrain 24. Drive track system 32 includes a track frame 34, an internal suspension 36, a plurality of idler wheels 38 such as idler wheels 38a, 38b, 38c, 38d and an endless track 40. Track frame 34 may be coupled to forward frame assembly 14 via a swing arm having a coil spring, a rigid strut, a torsion spring, an elastomeric member or any other suitable coupling configuration. Endless track 40 is driven by a track drive sprocket via a track driveshaft (not visible) that is rotated responsive to torque provided from continuously variable transmission 30. Endless track 40 rotates around track frame 34 and idler wheels 38 to propel snowmobile 10 in either the forward direction, as indicated by arrow 42a, or the backwards direction, as indicated by arrow 42b. When viewed from the right side of snowmobile 10, endless track 40 rotates around track frame 34 and idler wheels 38 in the clockwise direction, as indicated by arrow 44a, to propel snowmobile 10 in forward direction 42a. Endless track 40 rotates around track frame 34 and idler wheels 38 in the counterclockwise direction, as indicated by arrow 44b, to propel snowmobile 10 in backward direction 42b. Forward and backward directions 42a, 42b also represent the longitudinal direction of snowmobile 10 with the lateral direction of snowmobile 10 being normal thereto and represented by the rightward direction, as indicated by arrow 46a, and the leftward direction, as indicated by arrow 46b in FIG. 1A. The backward direction may also be referred to herein as the aftward direction.

Snowmobile 10 has a steering system 48 that includes a handlebar assembly 50, a steering column 52, a steering arm assembly 54, a right tie rod 56, a left tie rod 58, a right ski assembly 60 including a right spindle 60a and a right ski 60b and a left ski assembly 62 including a left spindle 62a and a left ski 62b. Right ski assembly 60 and left ski assembly 62 may be referred to collectively as the ski system of snowmobile 10. Snowmobile 10 has a front suspension assembly 64 that is coupled between forward frame assembly 14 and ski assemblies 60, 62 to provide front end support for snowmobile 10. In addition, right ski assembly 60 is coupled to forward frame assembly 14 by upper and lower A-arms 66a, 66b, and left ski assembly 62 is coupled to forward frame assembly 14 by upper and lower A-arms 68a, 68b. Steering system 48 enables the rider to steer snowmobile 10 by rotating handlebar assembly 50, which causes ski assemblies 60, 62 to pivot. In the illustrated embodiment, the pivoting of ski assemblies 60, 62 responsive to rotation of handlebar assembly 50 is assisted by an electric power steering system (EPS) depicted as electronic steering assist unit 70.

The rider controls snowmobile 10 from a seat 72 that is positioned atop a fuel tank 74, above drive tunnel 18, aft of handlebar assembly 50 and aft of forward frame assembly 14. Snowmobile 10 has a lift bumper 76 that is coupled to an aft end of drive tunnel 18 that enables a person to lift the rear end of snowmobile 10 in the event snowmobile 10 becomes stuck or needs to be repositioned when it is not moving. Snowmobile 10 has a snow flap 78 that deflects snow emitted by endless track 40. A taillight housing 80 is also coupled to lift bumper 76 and houses a taillight of snowmobile 10. Snowmobile 10 has an exhaust system 82 that includes an exhaust manifold 84 that is coupled to one or more exhaust outlets on engine 26, an exhaust duct 86 and a muffler 88.

Figure 2A:
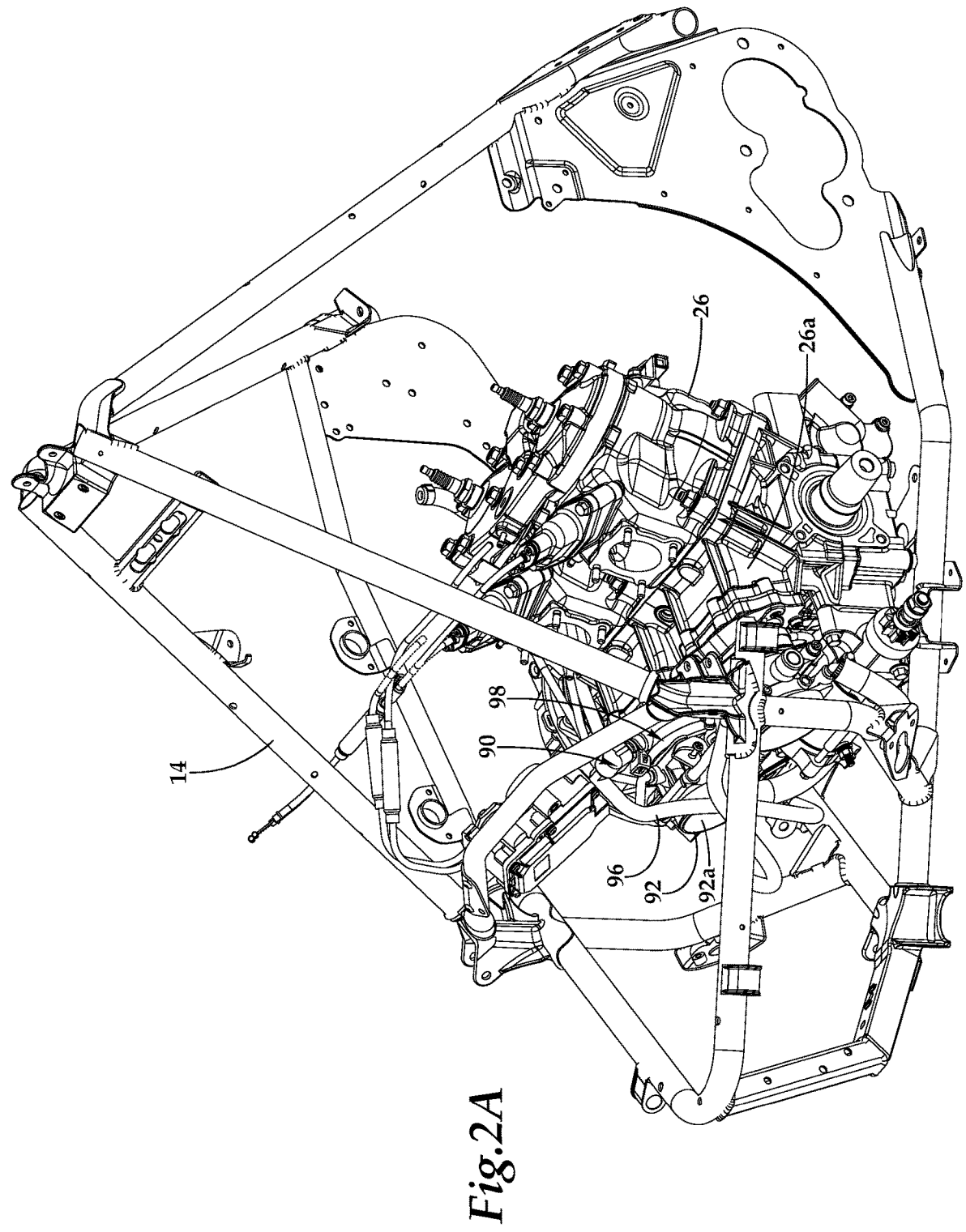
Figure 2C:
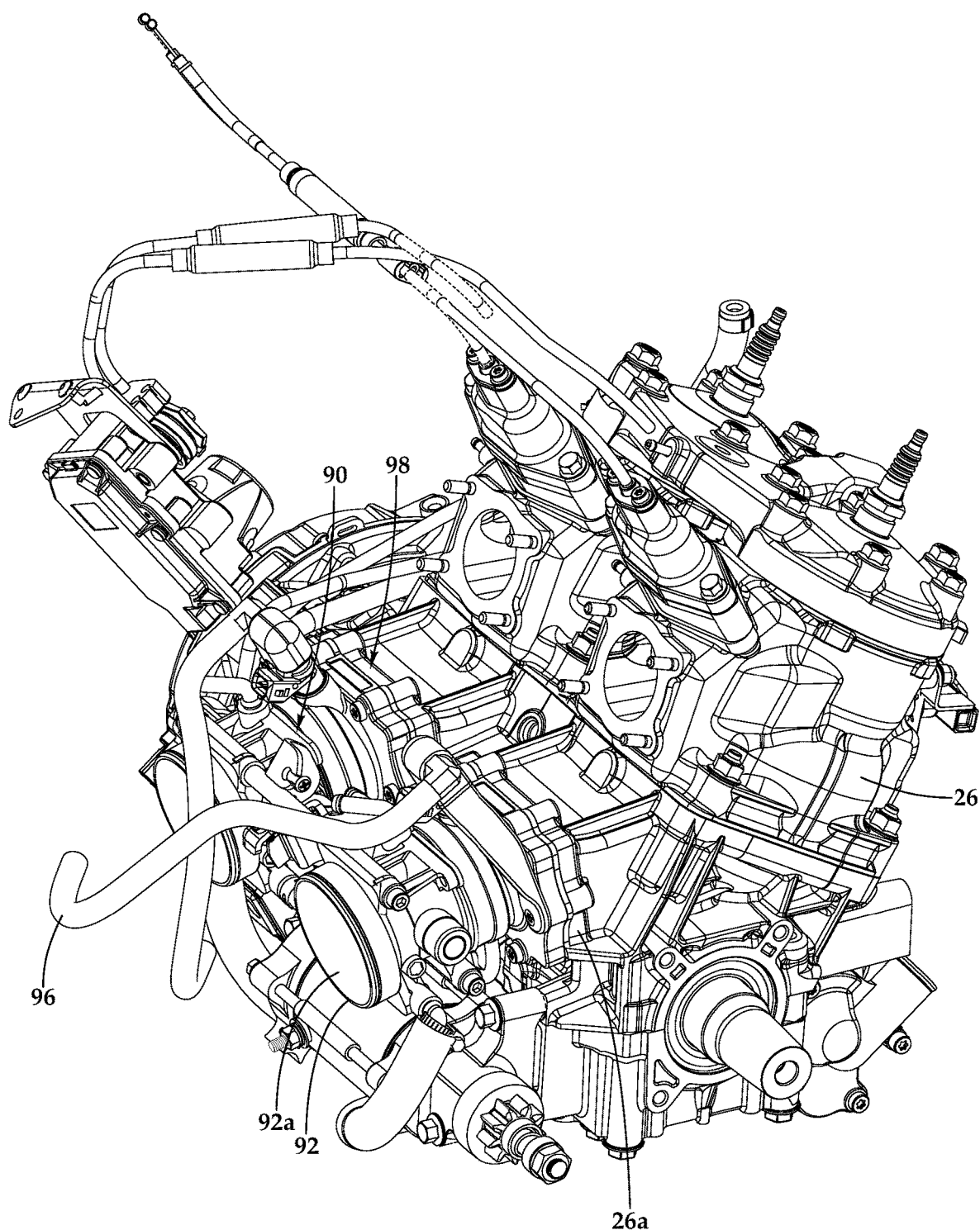

Referring additionally to FIGS. 2A-2C in the drawings, various subsystems of snowmobile 10 are schematically illustrated. Engine 26 is disposed within, and protected by, forward frame assembly 14 as best seen in FIG. 2A. Engine 26 may be any type of engine such as a four-stroke engine, a two-stroke engine or other prime mover. In the illustrated embodiment, engine 26 is an internal combustion engine such as a naturally aspirated internal combustion engine, a supercharged internal combustion engine or a turbo charged internal combustion engine. Snowmobile 10 includes a fuel injection system 90 including throttle bodies 92. Snowmobile fuel injection systems typically include, or work in conjunction with, a throttle body, which controls the amount of filtered air entering engine 26. Fuel injection systems also include a fuel injector that sprays fuel into the filtered air at some point along the airflow path to the engine to form an air-fuel mixture that is combusted by the engine. In existing fuel injection systems, the fuel injector is hard-mounted on a metal throttle body and injects fuel into the airflow channel defined by the throttle body. Due to the distance between the engine and the throttle body, in these existing systems fuel delivery to the engine is less immediate, resulting in a less efficient engine and degraded throttle response. Another drawback of injecting fuel directly into the throttle body airflow channel is the larger distance between the point of fuel injection and the downstream reed valve, resulting in a less atomized air-fuel mixture. Reduced fuel atomization also occurs in cylinder wall injection designs, in which the fuel injector emits fuel directly into the cylinder of the engine.

In addition, a number of drawbacks result from mounting the fuel injector to the metal material from which the throttle body is made. For example, vibrations from other parts of the snowmobile are readily transferred to the fuel injector, which reduces the life cycle of the fuel injector and can lead to permanent damage. Also, metal throttle bodies tend to condensate and have moisture buildup, especially on the bottom of the throttle body airflow channel where moisture pools at the bottom of the airflow channel due to gravity. Moisture inside the throttle body is easily frozen in the low-temperature operating environment of a snowmobile, which can cause the fuel injector to freeze and thereby degrade operation of the engine. This freezing issue is a particular risk in snowmobile fuel injection systems in which the fuel injector is mounted on the bottom side of a metal throttle body since the moisture pooled at the bottom of the throttle body airflow channel is prone to freezing. Mounting a fuel injector to a metal throttle body is also costly due to the need to machine a mount into the throttle body to accept the fuel injector.

Fuel injection system 90 addresses the aforementioned drawbacks of existing fuel injection systems. Fuel injection system 90 is coupled to an intake side 26a of engine 26. In the illustrated embodiment, intake side 26a of engine 26 is positioned on the forward side of engine 26, although in other embodiments intake side 26a may be positioned on other portions of engine 26 such as the aft, top, bottom, left or right side of engine 26. Air is delivered to engine 26 by an air intake system 94 including an air inlet 94a and an air duct 94b (see FIG. 1C). Air intake system 94 receives air from the atmosphere and filters and distributes the air to each of the cylinders of engine 26. Before reaching the cylinders of engine 26, the air from air intake system 94 is delivered to fuel injection system 90. More particularly, the downstream end of air intake system 94 is coupled to upstream ends 92a of throttle bodies 92 such that throttle bodies 92 receive air from air intake system 94. Fuel injection system 90 mixes fuel with the air received from air intake system 94. The fuel that fuel injection system 90 injects into the air received from air intake system 94 is delivered to fuel injection system 90 from fuel tank 74 via fuel lines 96. Together, fuel injection system 90 and intake side 26a of engine 26 may form an intake manifold 98 that delivers a fuel-air mixture to each of the cylinders of engine 26.

It should be appreciated that snowmobile 10 is merely illustrative of a variety of vehicles that can implement the embodiments disclosed herein. Indeed, fuel injection system 90 may be implemented on any ground-based vehicle. Other vehicle implementations can include motorcycles, snow bikes, all-terrain vehicles (ATVs), utility vehicles, recreational vehicles, scooters, automobiles, mopeds, straddle-type vehicles and the like. As such, those skilled in the art will recognize that fuel injection system 90 can be integrated into a variety of vehicle configurations. It should be appreciated that even though ground-based vehicles are particularly well-suited to implement the embodiments of the present disclosure, airborne vehicles and devices such as aircraft can also implement the embodiments.

Referring to FIGS. 3A-3E in the drawings, a fuel injection system for a snowmobile such as snowmobile 10 in FIGS. 1A-1C is schematically illustrated and generally designated 100. Fuel injection system 100 includes throttle bodies 102, 104 having upstream ends 102a, 104a and downstream ends 102b, 104b. Throttle bodies 102, 104 define internal airflow channels 102c, 104c through which air 106 moves. While airflow channels 102c, 104c each have a generally circular cross-sectional shape, airflow channels 102c, 104c may have any cross-sectional shape such as an elliptical, polygonal or irregular cross-sectional shape. Upstream ends 102a, 104a of throttle bodies 102, 104 are coupled to the downstream end of an air intake system for the snowmobile such as air intake system 94 illustrated in FIG. 1C. Thus, airflow channels 102c, 104c of throttle bodies 102, 104 receive filtered air 106 from an air intake system. Throttle bodies 102, 104 control the amount of air 106 that flows to the engine using butterfly valves 102d, 104d in airflow channels 102c, 104c. Butterfly valves 102d, 104d are operatively coupled to the throttle of the snowmobile such that butterfly valves 102d, 104d gradually open as the throttle is increasingly engaged. For example, butterfly valves 102d, 104d may be open only a small amount when the snowmobile is idling to allow a small amount of air 106 to reach the engine and may be fully open when the snowmobile is travelling at full speed to allow a large amount of air 106 to reach the engine. Throttle bodies 102, 104 may be formed from metal or any other strong rigid material.

Figure 3A:
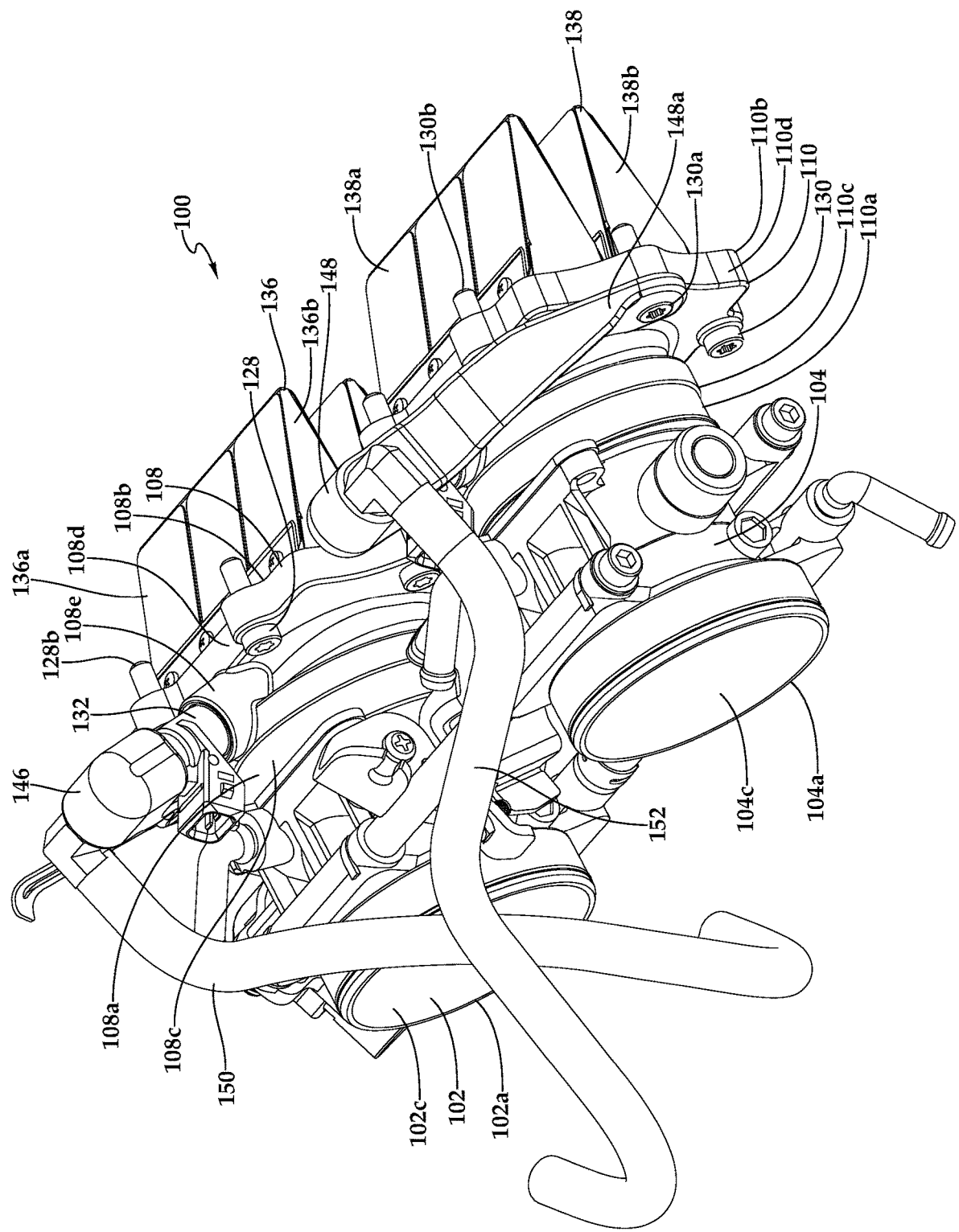
FIGS. 3A-3E are various views of a split rail fuel injection system for a snowmobile engine in accordance with embodiments of the present disclosure.
Figure 3B:
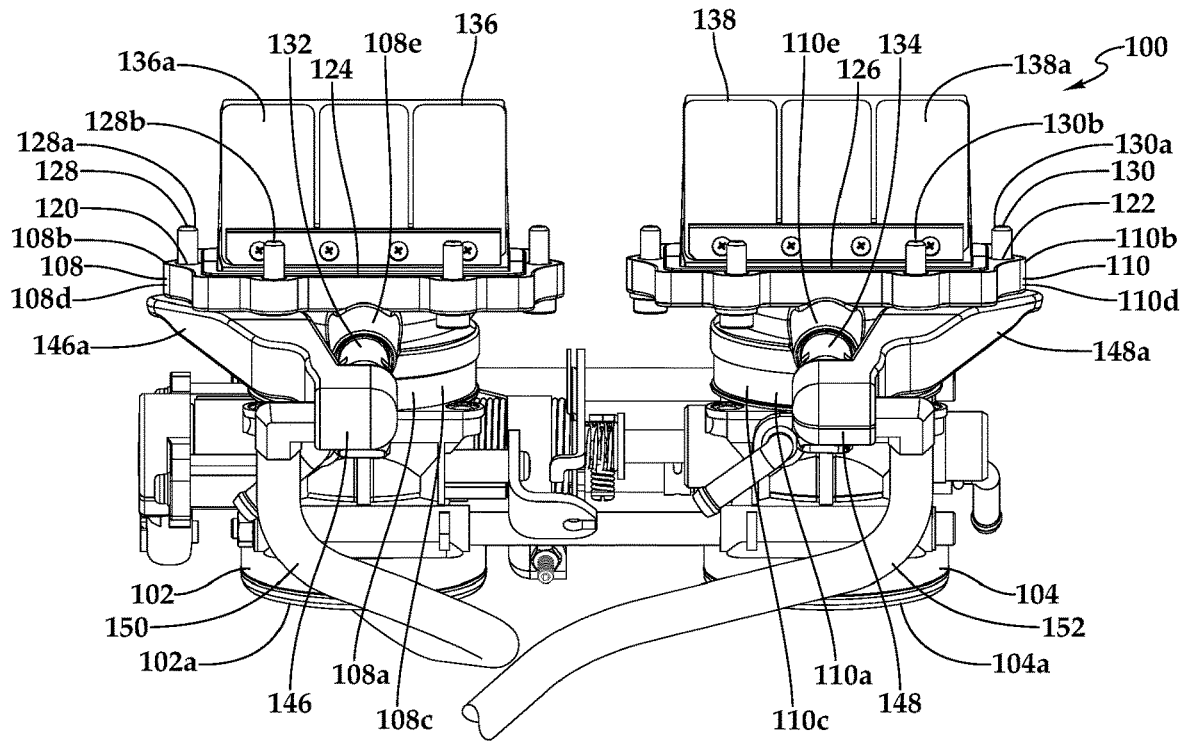
Figure 3C:
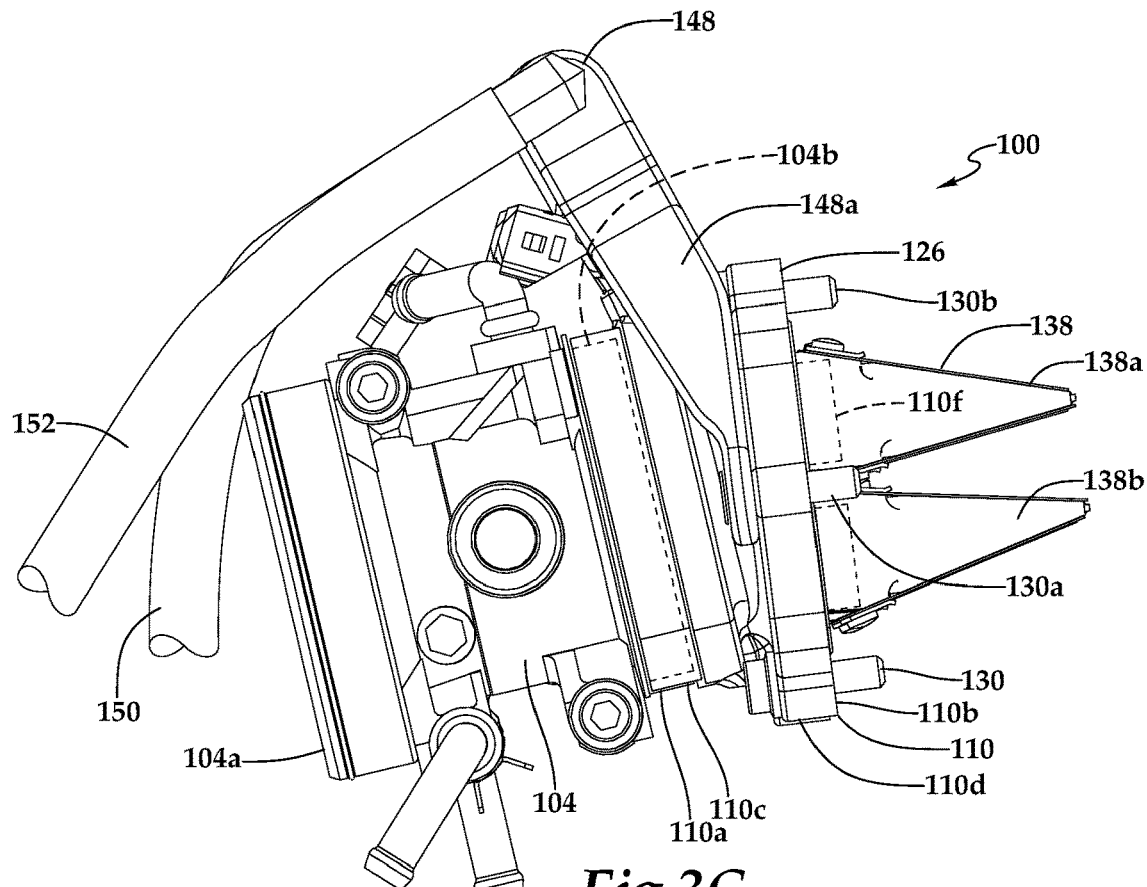
Figure 3D:
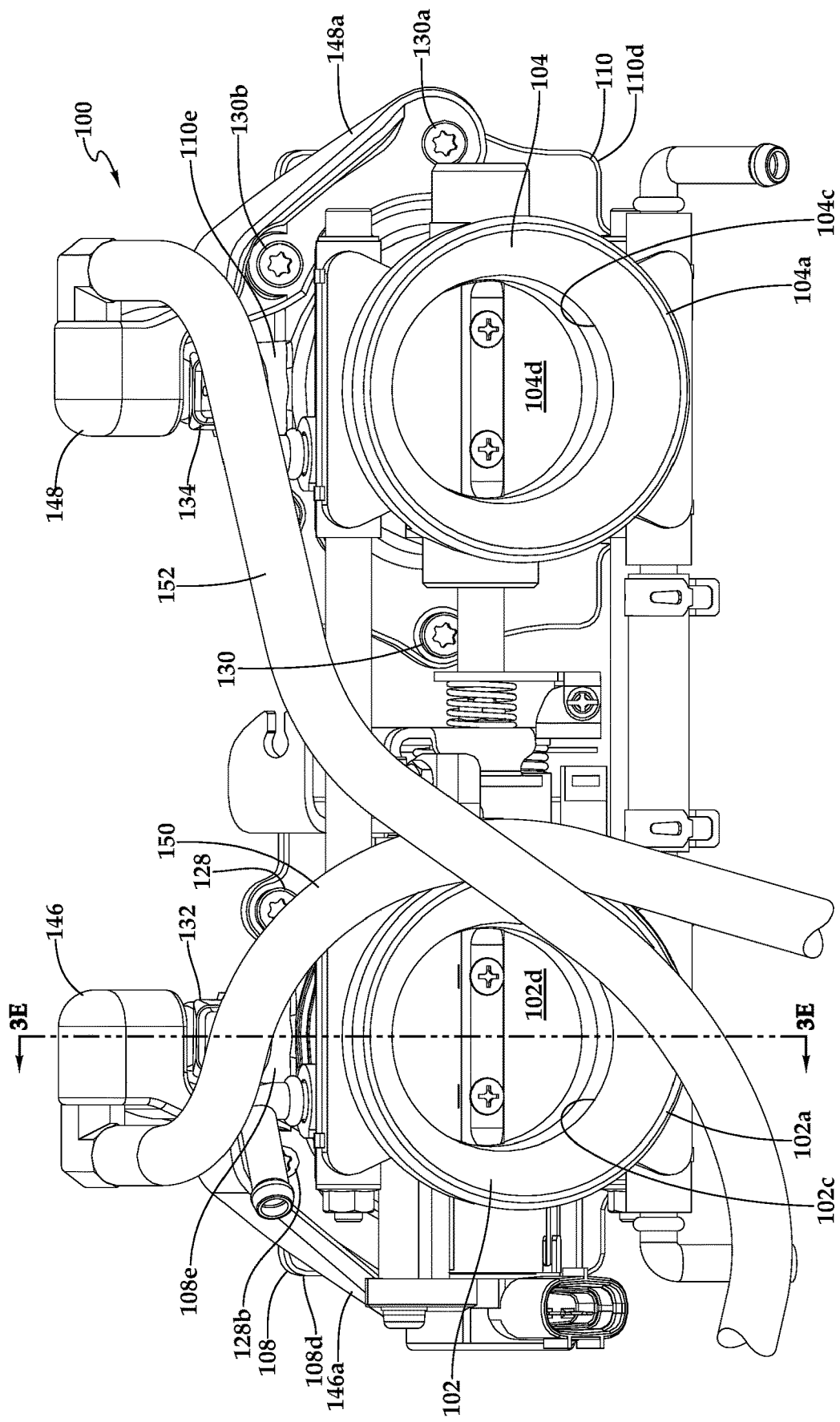
Figure 3E:
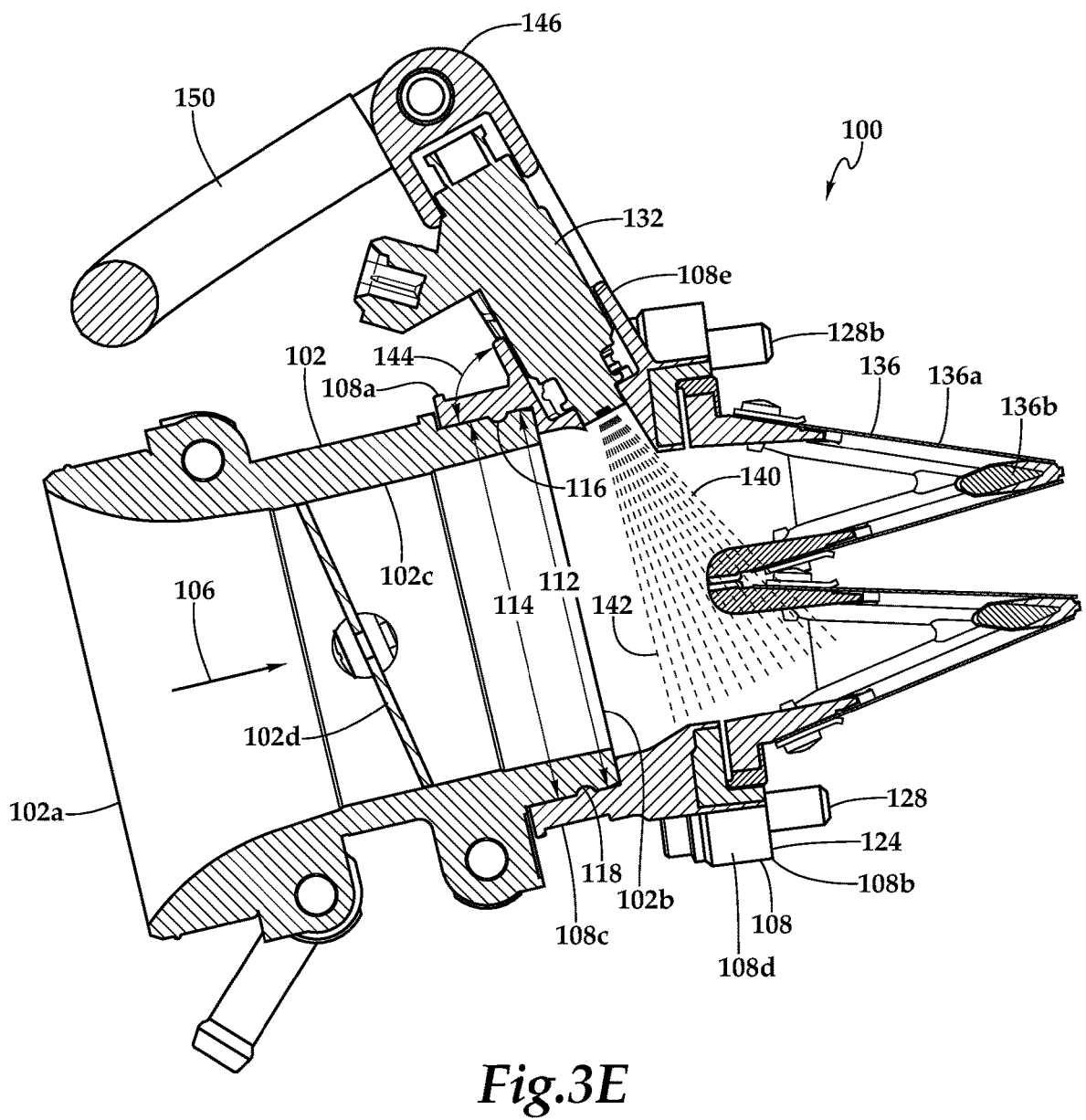
Figure 4A:
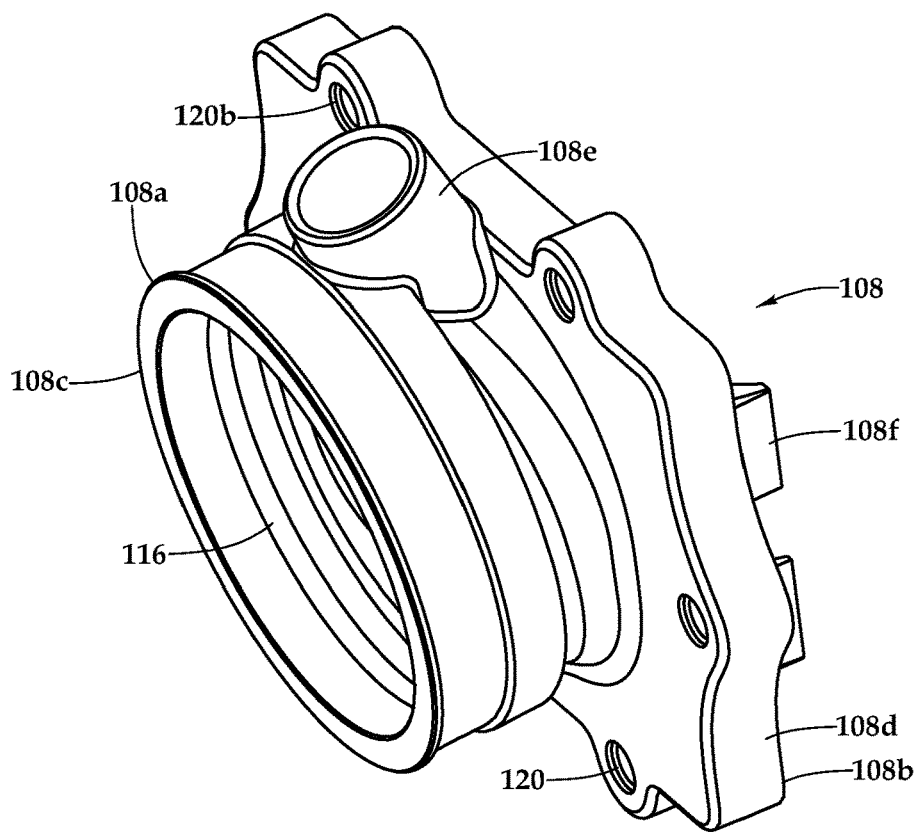
FIGS. 4A-4C are various views of an injection manifold for a fuel injection system in accordance with embodiments of the present disclosure.
Figure 4B:
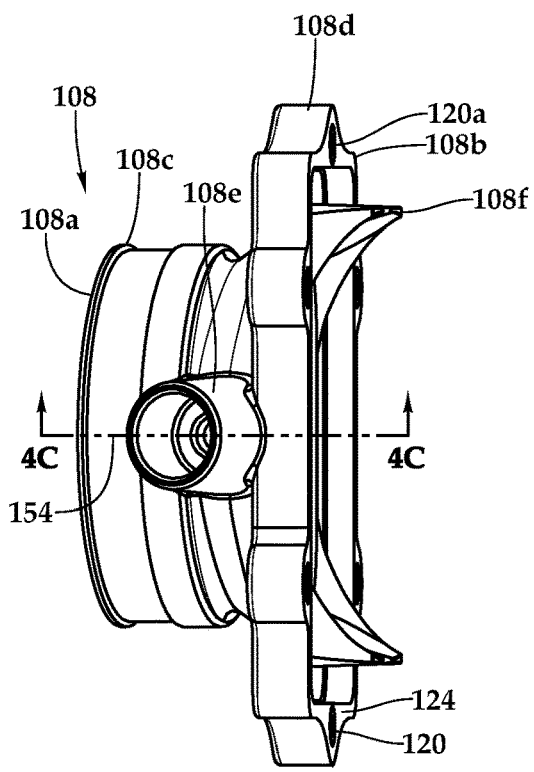
Figure 4C:
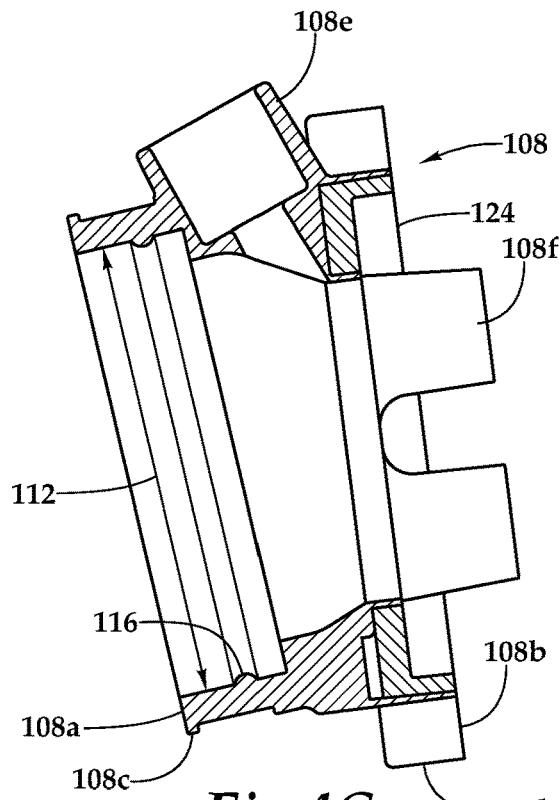
Figure 5A:
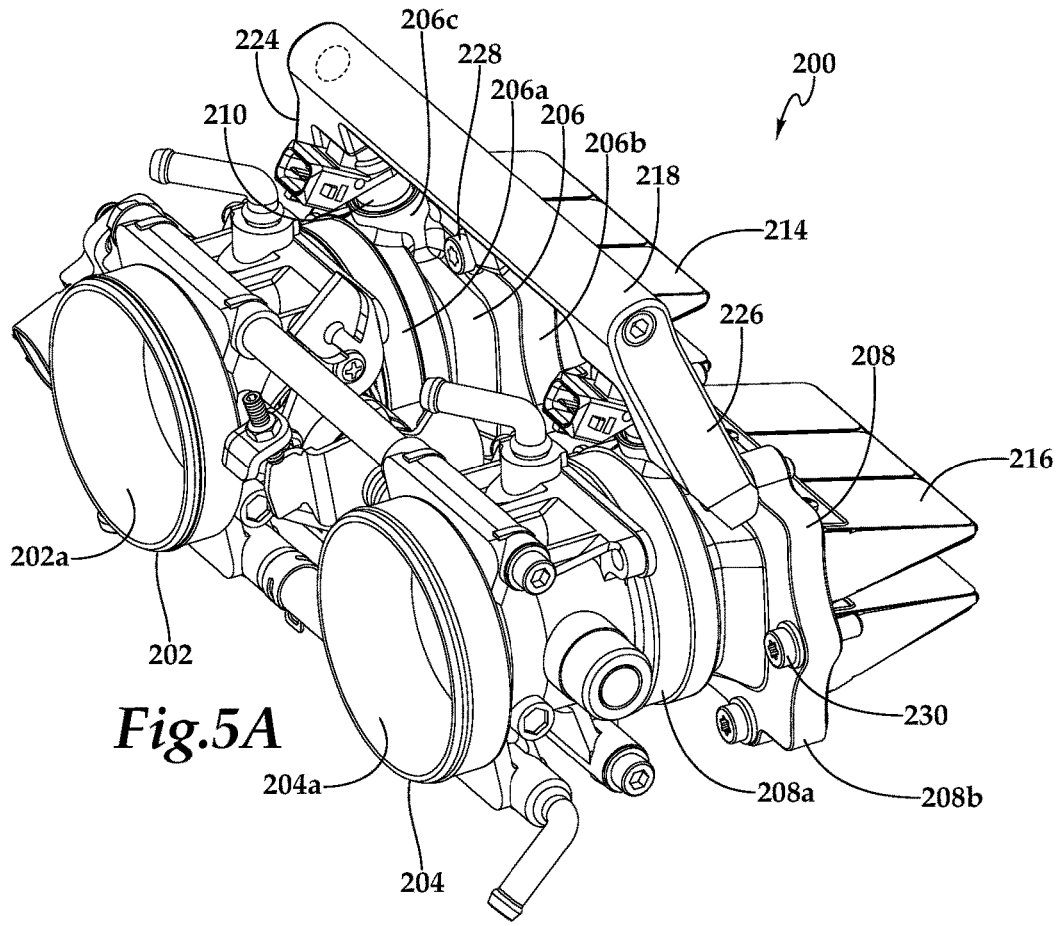
FIGS. 5A-5D are various views of a monorail fuel injection system for a snowmobile engine in accordance with embodiments of the present disclosure.
Figure 5B:
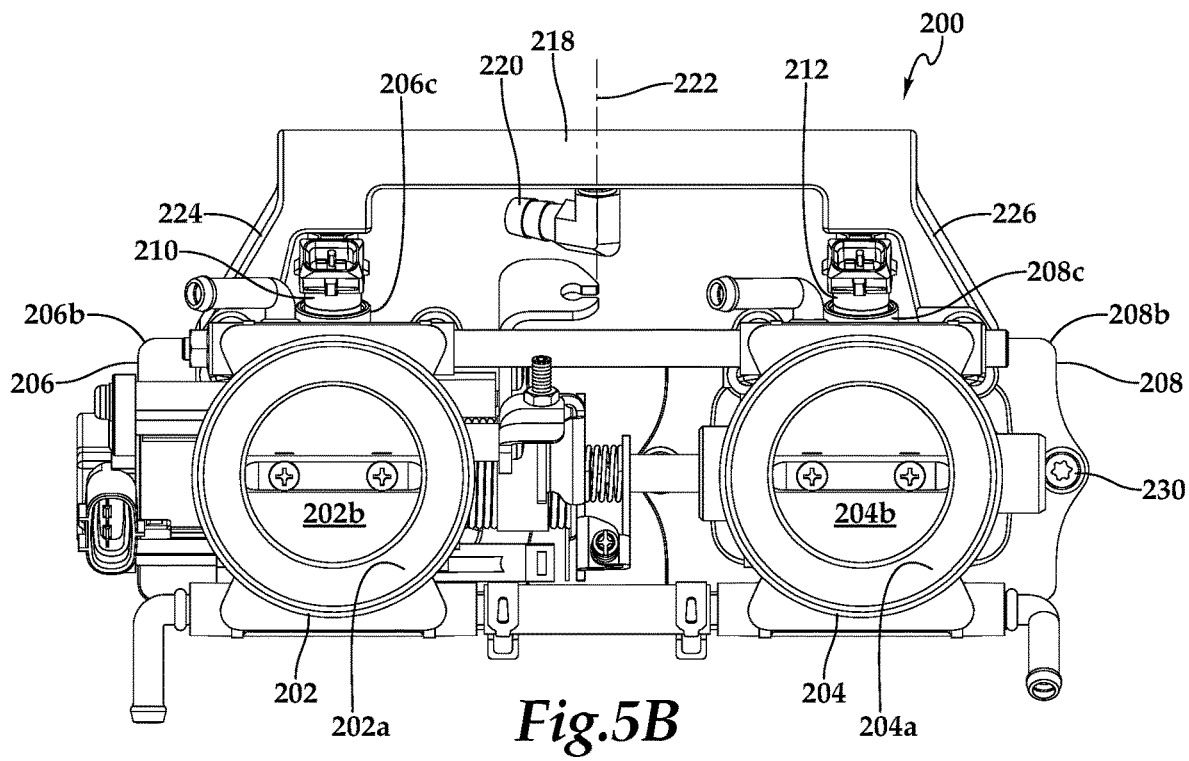
Figure 5C:
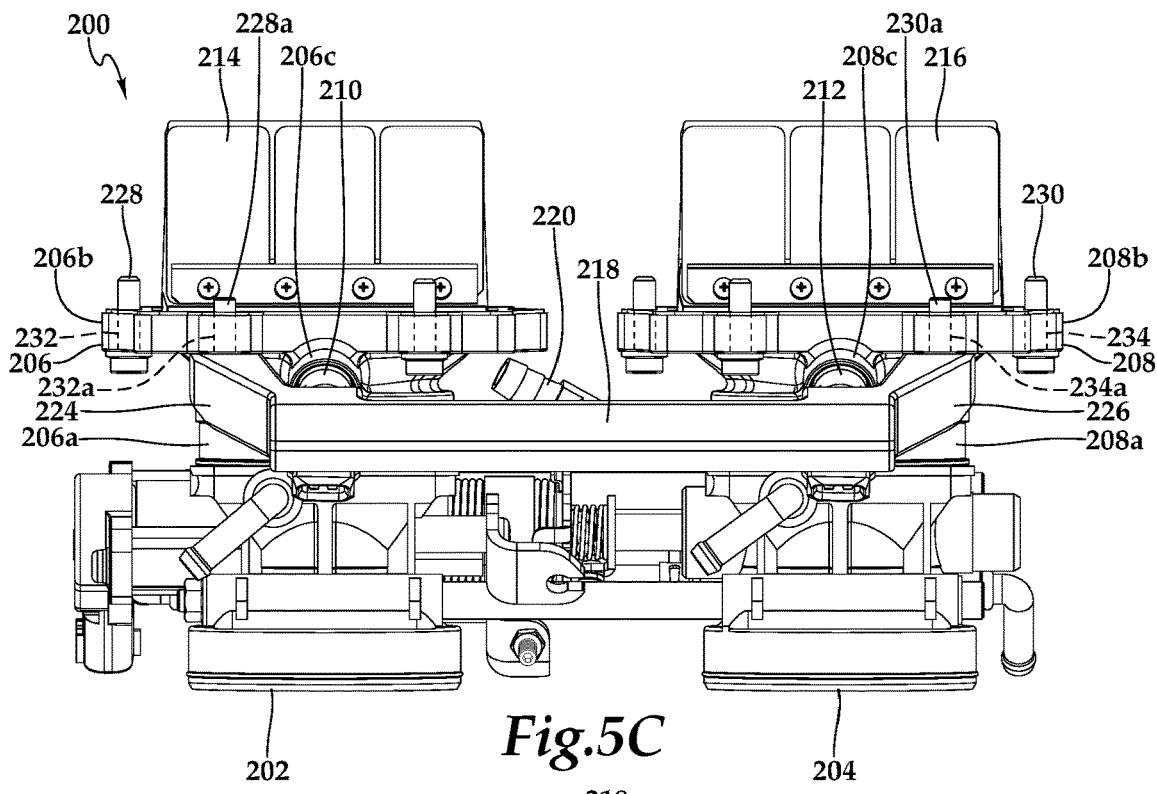
Figure 5D:
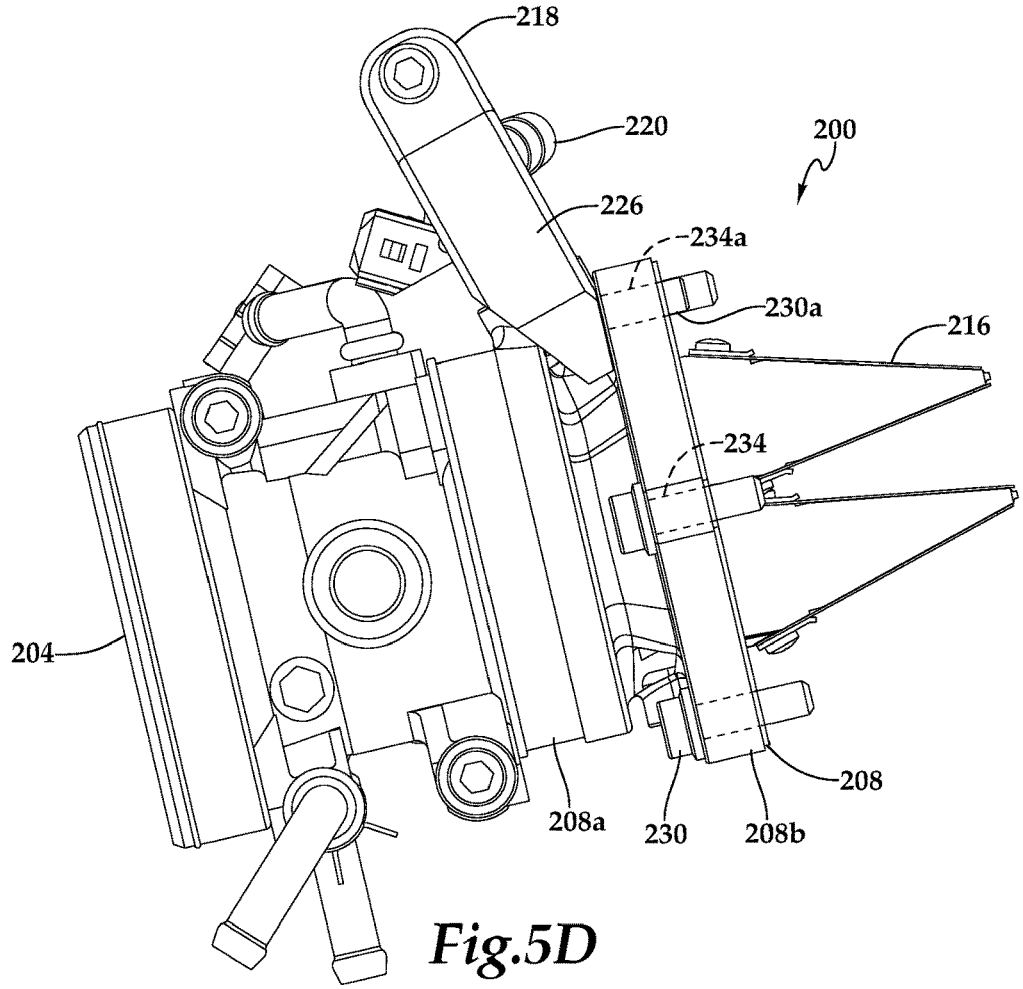

Referring additionally to FIGS. 4A-4C in the drawings, fuel injection system 100 includes injection manifolds 108, 110 coupled to throttle bodies 102, 104, respectively. Injection manifolds 108, 110 have upstream sides 108a, 110a and downstream sides 108b, 110b. Upstream sides 108a, 110a of injection manifolds 108, 110 each include a throttle body fitting 108c, 110c for connecting injection manifolds 108, 110 to throttle bodies 102, 104. Throttle body fittings 108c, 110c have generally circular cross-sectional shapes to complement the generally circular air conduits defined by downstream ends 102b, 104b of throttle bodies 102, 104. In other embodiments, throttle body fittings 108c, 110c may have noncircular cross-sectional shapes such as elliptical, polygonal or irregular cross-sectional shapes to complement the size and/or shape of downstream ends 102b, 104b of throttle bodies 102, 104. As best seen in FIG. 3E, throttle body fittings 108c, 110c fit over downstream ends 102b, 104b of throttle bodies 102, 104. More particularly, throttle body fittings 108c, 110c have an inner diameter 112 and downstream ends 102b, 104b of throttle bodies 102, 104 have an outer diameter 114. Inner diameter 112 of throttle body fittings 108c, 110c is equal to or greater than outer diameter 114 of downstream ends 102b, 104b of throttle bodies 102, 104 such that throttle body fittings 108c, 110c may be slid or stretched over downstream ends 102b, 104b of throttle bodies 102, 104. The throttle body-facing surfaces of throttle body fittings 108c, 110c may each include a protrusion depicted as annular bump 116 to complement an indent 118 on the throttle body fitting-facing surfaces of downstream ends 102b, 104b of throttle bodies 102, 104, thereby allowing for a secure or snap fit between injection manifolds 108, 110 and throttle bodies 102, 104. In embodiments in which injection manifolds 108, 110 are made from a stretchable elastomeric material such as rubber, throttle body fittings 108c, 110c may be stretched to fit over downstream ends 102b, 104b of throttle bodies 102, 104. Alternatively or additionally, throttle body fittings 108c, 110c may be press fit to downstream ends 102b, 104b of throttle bodies 102, 104 or may be fastened or adhered to downstream ends 102b, 104b of throttle bodies 102, 104 using fasteners or adhesive.

Downstream sides 108b, 110b of injection manifolds 108, 110 each include a flat plate portion 108d, 110d. Plate portions 108d, 110d of injection manifolds 108, 110 are downstream of throttle body fittings 108c, 110c of injection manifolds 108, 110. In the illustrated embodiment, plate portions 108d, 110d of injection manifolds 108, 110 are integral, or monolithic, with throttle body fittings 108c, 110c of injection manifolds 108, 110, respectively, being thus formed out of the same material. In other embodiments, however, plate portions 108d, 110d of injection manifolds 108, 110 may be separate components from throttle body fittings 108c, 110c of injection manifolds 108, 110, and in such embodiments plate portions 108d, 110d of injection manifolds 108, 110 may be coupled to throttle body fittings 108c, 110c of injection manifolds 108, 110 using any means such as fasteners, adhesive, threads, a press fit or a snap fit. Plate portions 108d, 110d of injection manifolds 108, 110 each define multiple fastener holes 120, 122 so that plate portions 108d, 110d may be coupled to other components of fuel injection system 100 and/or the snowmobile. For example, plate portions 108d, 110d of injection manifolds 108, 110 each have a downstream, engine-facing side 124, 126 that fully or partially abuts an engine such as engine 26 as best seen in FIG. 2C. Fasteners 128, 130 are received by fastener holes 120, 122 to couple plate portions 108d, 110d of injection manifolds 108, 110 to engine 26 such that injection manifolds 108, 110 are interposed between throttle bodies 102, 104 and engine 26. In the illustrated embodiment, plate portions 108d, 110d of injection manifolds 108, 110 each have a multisided or polygonal shape, which conforms to the shape of an air-fuel intake side of an engine such as intake side 26a of engine 26 in FIGS. 2A-2C. In other embodiments, however, plate portions 108d, 110d of injection manifolds 108, 110 may have a rounded shape such as a circular or elliptical shape, an irregular shape or any other shape depending, at least in part, on the size and shape of other components of the snowmobile to which plate portions 108d, 110d are coupled.

The top sides of injection manifolds 108, 110 each include a fuel injector socket 108e, 110e sized and shaped to receive a respective fuel injector 132, 134. In the illustrated embodiment, fuel injector socket 108e is partially interposed between throttle body fitting 108c and plate portion 108d of injection manifold 108 in that fuel injector socket 108e overlaps throttle body fitting 108c and plate portion 108d, as best seen in FIGS. 4A-4B. Likewise, fuel injector socket 110e is partially interposed between throttle body fitting 110c and plate portion 110d of injection manifold 110. In other embodiments, however, fuel injector sockets 108e, 110e may be fully interposed between throttle body fittings 108c, 110c and plate portions 108d, 110d of injection manifolds 108, 110. In the illustrated embodiment, fuel injector sockets 108e, 110e are integral, or monolithic, with plate portions 108d, 110d and throttle body fittings 108c, 110c of injection manifolds 108, 110, respectively, being thus formed out of the same material. In other embodiments, however, fuel injector sockets 108e, 110e may be separate components from plate portions 108d, 110d and/or throttle body fittings 108c, 110c of injection manifolds 108, 110, and in such embodiments fuel injector sockets 108e, 110e may be coupled to plate portions 108d, 110d and/or throttle body fittings 108c, 110c of injection manifolds 108, 110 using any means such as fasteners, adhesive, threads, a press fit or a snap fit. In the illustrated embodiment, injection manifolds 108, 110 are formed from an elastomeric material such as rubber. Since fuel injectors 132, 134 are secured by elastomeric fuel injector sockets 108e, 110e, injection manifolds 108, 110 are nonmetallic vibration damping injection manifolds that reduce the vibration transferred to fuel injectors 132, 134 from other parts of the snowmobile, thus lengthening the life cycle of fuel injectors 132, 134 and preventing damage thereto. In embodiments in which throttle body fittings 108c, 110c, plate portions 108d, 110d and fuel injector sockets 108e, 110e of injection manifolds 108, 110 are separate components coupled to one another in the described arrangement, throttle body fittings 108c, 110c, plate portions 108d, 110d and fuel injector sockets 108e, 110e may be formed from the same or different materials. In one non-limiting example, fuel injector sockets 108e, 110e may be formed from an elastomeric material and throttle body fittings 108c, 110c and plate portions 108d, 110d may be formed from a more rigid material such as metal or certain polymers. In alternative embodiments, injection manifolds 108, 110 including throttle body fittings 108c, 110c, plate portions 108d, 110d and fuel injector sockets 108e, 110e may be formed from a rigid material such as metal or certain polymers.

Fuel injection system 100 includes reed valves 136, 138 coupled to downstream sides 108b, 110b of injection manifolds 108, 110 such that injection manifolds 108, 110 are interposed between throttle bodies 102, 104 and reed valves 136, 138, respectively. Specifically, reed valves 136, 138 are coupled to engine-facing sides 124, 126 of plate portions 108d, 110d of injection manifolds 108, 110. Downstream sides 108b, 110b of injection manifolds 108, 110 may include reed valve mounts 108f, 110f to secure reed valves 136, 138 to injection manifolds 108, 110. Reed valves 136, 138 include reeds 136a, 138a mounted to reed cages 136b, 138b. Fuel injectors 132, 134 spray fuel 140 along a fuel spray path 142 and into incoming air 106 moving through throttle bodies 102, 104 to form a fuel-air mixture. Fuel injectors 132, 134 work together with butterfly valves 102d, 104d of throttle bodies 102, 104 to ensure a proper fuel-air mixture is delivered to the engine based on the throttle position of the snowmobile as well as other factors. Reed valves 136, 138 ensure that the fuel-air mixture flows in the upstream to downstream direction and not vice versa, thereby acting as a one-way valve.

In the illustrated embodiment, fuel injector sockets 108e, 110e are tilted fuel injector sockets that are tilted toward throttle bodies 102, 104 to form acute angles 144 therewith, as best seen in FIG. 3E. Since fuel injector sockets 108e, 110e form acute angles 144 with throttle bodies 102, 104, fuel injector sockets 108e, 110e are nonperpendicular with throttle bodies 102, 104. Acute angle 144 may be any angle less than 90 degrees such as an angle in a range between 20 degrees and 80 degrees. Because fuel injector sockets 108e, 110e are tilted in this manner, fuel 140 sprayed along fuel spray path 142 by fuel injectors 132, 134 at least partially covers the upstream end of reed valves 136, 138, as best seen in FIG. 3E. Spraying fuel 140 directly in front of reed valves 136, 138 helps to better atomize fuel 140 in the fuel-air mixture before reaching the engine cylinders. In other embodiments, fuel injector sockets 108e, 110e may be perpendicular with throttle bodies 102, 104, in which case angle 144 is approximately 90 degrees. In yet other embodiments, fuel injector sockets 108e, 110e may form obtuse angles with throttle bodies 102, 104.

Fuel injection system 100 features a split rail design with separate fuel rails including a fuel rail 146 fluidly coupled to fuel injector 132 and a fuel rail 148 fluidly coupled to fuel injector 134. Fuel rails 146, 148 supply fuel 140 to fuel injectors 132, 134, respectively. The illustrated split fuel rail design may be used to preserve space above throttle bodies 102, 104 to make room for other snowmobile components such as the exhaust manifold. Fuel 140 is delivered to fuel rails 146, 148 by separate fuel lines 150, 152, which transfer fuel 140 from a fuel tank such as fuel tank 74 in FIGS. 1A-1C and 2B. Fuel rails 146, 148 include fuel rail mounting arms 146a, 148a, which are used to mount fuel rails 146, 148 to injection manifolds 108, 110, respectively. Fuel rail mounting arms 146a, 148a are mounted to the upstream sides of plate portions 108d, 110d of injection manifolds 108, 110 using fasteners 128, 130 received by fastener holes 120, 122. In the illustrated embodiment, fuel rail mounting arms 146a, 148a are shaped to cover the outboard side fastener holes and the outboard top fastener holes of each injection manifold 108, 110. For example, with reference to FIGS. 4A-4B, fuel rail mounting arm 146a covers outboard side fastener hole 120a and the outboard top fastener hole 120b of injection manifold 108. Fasteners 128a, 128b are received by outboard side fastener hole 120a and outboard top fastener hole 120b to couple fuel rail mounting arm 146a to injection manifold 108. Fuel rail mounting arm 148a is coupled to injection manifold 110 in a similar arrangement using fasteners 130a, 130b. In alternative embodiments, fuel rail mounting arms 146a, 148a may be coupled to other portions of fuel injection system 100 and/or the snowmobile.

Fuel injector sockets 108e, 110e are defined on the top sides of injection manifolds 108, 110 along an upstream-downstream centerline 154 of each injection manifold 108, 110. Because fuel injector sockets 108e, 110e, and therefore fuel injectors 132, 134 and fuel rails 146, 148, are located on the top side of injection manifolds 108, 110, fuel injectors 132, 134 are less prone to freezing. In particular, top side fuel injection prevents fuel injectors 132, 134 from being frozen due to moisture pooled at the bottom of throttle body airflow channels 102c, 104c, thereby preserving the life cycle of fuel injectors 132, 134 and maintaining efficient operation of the engine. While fuel injector sockets 108e, 110e are defined on the top sides of injection manifolds 108, 110 in the illustrated embodiment, it will be appreciated that in alternative embodiments fuel injector sockets 108e, 110e may be defined on other sides of injection manifolds 108, 110 such as the inboard sides, outboard sides or bottom sides of injection manifolds 108, 110. In yet other embodiments, fuel injector sockets 108e, 110e may be offset from upstream-downstream centerline 154 on the top sides of injection manifolds 108, 110, and as such may be located on either the inboard top sides or outboard top sides of injection manifolds 108, 110. In comparison to existing fuel injection systems in which the fuel injectors are mounted on the throttle bodies, fuel injection system 100 has a better throttle response due to the decreased distance between fuel injectors 132, 134 and the engine. Fuel 140 is also better atomized in the fuel-air mixture reaching the engine due to the decreased distance between fuel injectors 132, 134 and reed valves 136, 138. In comparison to cylinder wall fuel injection designs, fuel 140 injected by fuel injection system 100 is better atomized since fuel 140 must first pass through reed valves 136, 138 before reaching the engine. Fuel injection system 100 is also easier and less expensive to manufacture since fuel injector sockets 108e, 110e are formed on elastomeric injection manifolds 108, 110 instead of metal throttle bodies. In some implementations, fuel injection system 100 may be used in a multistage fuel injection system in which fuel injectors are placed at various points in the airflow path to the engine and the fuel injectors inject fuel at different times based on various inputs such as RPM, airflow and throttle position to improve engine run quality. While fuel injection system 100 includes two throttle bodies 102, 104, two injection manifolds 108, 110, two reed valves 136, 138 and two fuel rails 146, 148, it will be appreciated by one of ordinary skill in the art that fuel injection system 100 may include any number of such components based on a wide range of factors such as the type of engine being used in the vehicle.

Referring to FIGS. 5A-5D in the drawings, a fuel injection system for a snowmobile such as snowmobile 10 in FIGS. 1A-1C is schematically illustrated and generally designated 200. Fuel injection system 200 includes throttle bodies 202, 204 defining airflow channels 202a, 204a through which air moves. Butterfly valves 202b, 204b selectively control the amount of air passing through throttle bodies 202, 204 and into the engine. Fuel injection system 200 includes elastomeric injection manifolds 206, 208 having throttle body fittings 206a, 208a coupled to the downstream ends of throttle bodies 202, 204, flat plate portions 206b, 208b downstream of throttle body fittings 206a, 208a and tilted fuel injector sockets 206c, 208c on the top sides of injection manifolds 206, 208 and at least partially interposed between throttle body fittings 206a, 208a and plate portions 206b, 208b, respectively. Fuel injector sockets 206c, 208c of injection manifolds 206, 208 secure fuel injectors 210, 212 received therein. Reed valves 214, 216 are coupled to the downstream sides of injection manifolds 206, 208. Fuel injectors 210, 212 spray fuel into the incoming air moving through throttle bodies 202, 204 to form a fuel-air mixture. Fuel injectors 210, 212 work together with butterfly valves 202b, 204b to ensure a proper fuel-air mixture is delivered to the engine based on the throttle position of the snowmobile as well as other factors.

In the illustrated embodiment, fuel injection system 200 features a monorail design including a single fuel monorail 218 fluidly coupled to both fuel injectors 210, 212. Fuel is delivered to fuel monorail 218 by a fuel line (not shown) connected to a hose nipple 220 on the underside of fuel monorail 218 at a centerline 222 of fuel monorail 218. Having received fuel from a fuel tank such as fuel tank 74 in FIGS. 1A-1C and 2B, fuel monorail 218 supplies fuel to fuel injectors 210, 212. The outboard ends of fuel monorail 218 include fuel rail mounting arms 224, 226, one on each outboard end of fuel monorail 218. Fuel rail mounting arms 224, 226 are mounted to the upstream sides of plate portions 206b, 208b of injection manifolds 206, 208 using fasteners 228, 230 received by fastener holes 232, 234 defined by injection manifolds 206, 208, respectively. Fuel rail mounting arms 224, 226 are shaped to cover the outboard top fastener hole 232a, 234a of each injection manifold 206, 208. Fastener 228a is received by outboard top fastener hole 232a to couple fuel rail mounting arm 224 to injection manifold 206. Similarly, fastener 230a is received by outboard top fastener hole 234a to couple fuel rail mounting arm 226 to injection manifold 208. The monorail design of the illustrated embodiment may be used in a variety of implementations including implementations that reduce the number of fuel lines running to fuel injectors 210, 212.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A fuel injection system for an engine of a vehicle, the fuel injection system comprising:
    a throttle body having an upstream end and a downstream end;
    an elastomeric injection manifold coupled to the downstream end of the throttle body, the injection manifold defining a fuel injector socket and having a flat plate portion defining a plurality of fastener holes;
    a fuel injector receivable by the fuel injector socket of the injection manifold; and
    a fuel rail fluidly coupled to the fuel injector, the fuel rail configured to supply fuel to the fuel injector, the fuel rail having a fuel rail mounting arm;
    wherein, the fuel rail mounting arm is coupled to the plate portion of the injection manifold using one or more fasteners received by the fastener holes.

2. The fuel injection system as recited in claim 1 wherein, the injection manifold has a top side defining the fuel injector socket.

3. The fuel injection system as recited in claim 1 wherein, the injection manifold is formed from rubber.

4. The fuel injection system as recited in claim 1 wherein, the injection manifold is a nonmetallic vibration damping injection manifold configured to reduce vibration transferred to the fuel injector from other parts of the vehicle.

5. The fuel injection system as recited in claim 1 wherein, the injection manifold comprises a throttle body fitting, the plate portion downstream of the throttle body fitting; and wherein, the fuel injector socket is at least partially interposed between the plate portion and the throttle body fitting.

6. The fuel injection system as recited in claim 1 wherein, the injection manifold has an upstream side comprising a circular throttle body fitting having an inner diameter;
    wherein, the downstream end of the throttle body defines a circular conduit having an outer diameter; and
    wherein, the inner diameter is greater than the outer diameter.

7. The fuel injection system as recited in claim 1 wherein, the fuel injector socket comprises a tilted fuel injector socket tilted toward the throttle body to form an acute angle therewith.

8. The fuel injection system as recited in claim 1 wherein, the injection manifold has an upstream side and a downstream side, the fuel injection system further comprising a reed valve coupled to the downstream side of the injection manifold such that the injection manifold is interposed between the throttle body and the reed valve.

9. The fuel injection system as recited in claim 8 wherein, the reed valve has an upstream end; and
    wherein, the fuel injector socket comprises a tilted fuel injector socket such that the fuel injector received therein has a fuel spray path at least partially covering the upstream end of the reed valve.

10. A snowmobile comprising:
    a frame assembly including a forward frame assembly;
    a powertrain including an engine, the engine disposed in the forward frame assembly; and
    a fuel injection system coupled to the engine, the fuel injection system comprising:
    a throttle body having an upstream end and a downstream end;
    an elastomeric injection manifold coupled to the downstream end of the throttle body, the injection manifold defining a fuel injector socket and having a flat plate portion defining a plurality of fastener holes;
    a fuel injector receivable by the fuel injector socket of the injection manifold; and
    a fuel rail fluidly coupled to the fuel injector, the fuel rail configured to supply fuel to the fuel injector, the fuel rail having a fuel rail mounting arm;
    wherein, the fuel rail mounting arm is coupled to the plate portion of the injection manifold using one or more fasteners received by the fastener holes.

11. The snowmobile as recited in claim 10 wherein, the throttle body comprises first and second throttle bodies;
    wherein, the injection manifold comprises first and second injection manifolds coupled to the downstream ends of the first and second throttle bodies, respectively;
    wherein, the fuel injector comprises first and second fuel injectors, the fuel injector sockets of the first and second injection manifolds configured to receive the first and second fuel injectors, respectively; and
    wherein, the fuel rail comprises a first fuel rail and a second fuel rail, the first fuel rail fluidly coupled to the first fuel injector and the second fuel rail fluidly coupled to the second fuel injector.

12. The snowmobile as recited in claim 11 wherein,
    the first fuel rail mounting arm of the first fuel rail is coupled to the first injection manifold using one or more fasteners received by the fastener holes defined by the plate portion of the first injection manifold; and
    wherein, the fuel rail mounting arm of the second fuel rail is coupled to the second injection manifold using one or more fasteners received by the fastener holes defined by the plate portion of the second injection manifold.

13. The snowmobile as recited in claim 10 wherein, the throttle body comprises first and second throttle bodies;
   wherein, the injection manifold comprises first and second injection manifolds coupled to the downstream ends of the first and second throttle bodies, respectively;
   wherein, the fuel injector comprises first and second fuel injectors, the fuel injector sockets of the first and second injection manifolds configured to receive the first and second fuel injectors, respectively; and
   wherein, the fuel rail comprises a fuel monorail fluidly coupled to the first and second fuel injectors, the fuel monorail configured to supply fuel to the first and second fuel injectors.

14. The snowmobile as recited in claim 13 wherein, the fuel rail mounting arm comprises first and second fuel rail mounting arms; and
   wherein, the fuel monorail has a first end comprising the first fuel rail mounting arm and a second end comprising the second fuel rail mounting arm, the first fuel rail mounting arm coupled to the first injection manifold, the second fuel rail mounting arm coupled to the second injection manifold.

15. The snowmobile as recited in claim 14 wherein,
   the first fuel rail mounting arm is coupled to the first injection manifold using one or more fasteners received by the fastener holes defined by the plate portion of the first injection manifold; and
   wherein, the second fuel rail mounting arm is coupled to the second injection manifold using one or more fasteners received by the fastener holes defined by the plate portion of the second injection manifold.

16. The snowmobile as recited in claim 10 wherein, the plate portion of the injection manifold having a downstream side; and
   wherein, the downstream side of the plate portion of the injection manifold is coupled to the engine using a plurality of fasteners received by the fastener holes.

\* \* \* \* \*